US006899444B1

(12) United States Patent
Biber et al.

(10) Patent No.: US 6,899,444 B1
(45) Date of Patent: May 31, 2005

(54) METHOD AND APPARATUS FOR A LAMP HOUSING

(75) Inventors: Catharina R. Biber, Portland, OR (US); Eric Immel, West Lynn, OR (US); Dave Payne, Aloha, OR (US); William L. Emery, Sherwood, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/047,270

(22) Filed: Jan. 14, 2002

(51) Int. Cl.[7] .......................... F21V 7/20; F21V 29/00; G03B 21/16

(52) U.S. Cl. ...................... 362/345; 362/293; 362/294; 362/373; 353/55

(58) Field of Search ................................ 362/218, 294, 362/345, 373, 264, 293; 353/52, 55; 352/202

(56) References Cited

U.S. PATENT DOCUMENTS 2,570,507 A * 10/1951 Gianni ........................ 353/55
3,492,069 A * 1/1970 Kapilow ...................... 353/55
3,586,851 A * 6/1971 Rudolph ..................... 362/293
3,639,751 A * 2/1972 Pichel ........................ 362/294
3,806,236 A * 4/1974 Downing .................... 362/294
3,936,686 A * 2/1976 Moore ........................ 362/294
4,411,516 A * 10/1983 Adachi et al. .............. 362/218
4,489,367 A * 12/1984 Herron et al. .............. 362/294
4,646,214 A * 2/1987 Mendleski .................. 362/294
4,682,276 A * 7/1987 Miller ........................ 362/294
4,733,335 A * 3/1988 Serizawa et al. ........... 362/373
4,780,799 A * 10/1988 Groh .......................... 362/294
4,970,431 A 11/1990 Vegter et al.
5,034,866 A * 7/1991 Pujol .......................... 362/373
5,367,444 A * 11/1994 Bornhorst et al. .......... 362/264
5,399,931 A 3/1995 Roberts
5,420,769 A 5/1995 Ahlgren et al.
5,692,821 A 12/1997 Rodriguez, Jr. et al.
5,721,465 A 2/1998 Roberts
6,004,010 A * 12/1999 Inage et al. ................. 362/294
6,034,467 A 3/2000 Roberts

* cited by examiner

*Primary Examiner*—Alan Cariaso
(74) *Attorney, Agent, or Firm*—Alleman Hall McCoy; Russell & Tuttle LLP

(57) ABSTRACT

A method and apparatus for a lamp housing is provided that blocks light and dissipates heat. The lamp housing encases or is integral to a reflector, and has an inner surface that absorbs radiation emitted by the lamp burner and an outer surface that allows for improved heat dissipation through radiation and convection means. The inner surface absorbs radiation and the outer surface is enlarged with a plurality of formations for improved heat dissipation through radiation and convection means. The housing also blocks stray visible light from escaping, thereby reducing or eliminating the need for light leakage systems.

51 Claims, 10 Drawing Sheets

METHOD AND APPARATUS FOR A LAMP HOUSING

FIELD OF THE INVENTION

The present invention relates generally to high intensity lamps, and specifically to a lamp housing that manages the light and radiation generated by the lamp.

BACKGROUND OF THE INVENTION

A popular type of multimedia projection system employs a broad-spectrum light source and optical path components upstream and downstream of an image-forming device, such as a liquid crystal display ("LCD") or a digital micro-mirror device ("DMD"), to project the image onto a display screen. An example of an LCD projector that includes a transmissive LCD, a light source, and projection optics to form and project display images is manufactured and sold under the trademark LP® and LitePro® by InFocus Corporation of 27700B SW Parkway Avenue, Wilsonville, Oregon 97070-9215, the assignee of the present application. An example of a DMD-based multimedia projector is the InFocus LP420 model.

A typical broad-spectrum light source used in a multimedia projector is a high-intensity discharge (HID) lamp. The light from the HID lamp is collected in a reflector that shapes the light and pushes it forward into the projection optics. However, the HID lamp generates such an intense amount of light and radiation that a reflector alone cannot address all of the safety and operational concerns associated with using an HID lamp in a multimedia projector. For example, the HID lamp is prone to explosion under certain conditions. Moreover, during operation light and radiation may get into areas of the projector where it can be harmful, damaging sensitive electronic and optical components or melting the surrounding plastic components. As is often the case, stray visible light may escape from the projector altogether and reduce the visibility of the projected image. The radiation and resulting heat generated by the light source also presents a secondary problem of noise generated by the fans used to cool the lamp, lamp reflector, and surrounding parts of the projector.

Several different types of reflectors have been designed in an effort to overcome some of these safety and operational concerns. For example, cold mirror glass reflectors reflect most of the visible light forward, but allow the ultraviolet (UV) and infrared (IR) radiation to pass through. But glass reflectors may not adequately contain an HID lamp explosion. Moreover, the UV and IR radiation passing through the reflector can be particularly harmful when striking other parts of the projector causing them to overheat, sometimes to the point of melting. Heat sinks have been used to conduct heat from the walls of the reflector to the exterior of the projector or to the circulating air within, but prior art heat sinks are typically unsuited for use in a multimedia projection system as they may be too large or too heavy or otherwise interfere with the operation of the projector.

An alternative reflector is an aluminum reflector which reflects the visible light and all of the IR radiation into the optical chamber. While an aluminum reflector may contain the HID lamp in the case of an explosion and may reduce the amount of heat radiated to some parts of the projector, it presents other problems since the IR radiation adversely affects the sensitive optical components present in the optical chamber.

SUMMARY

A method for a lamp housing is provided that encases or is integral to a reflector, and has an inner surface that absorbs radiation emitted by the lamp burner and an outer surface that allows for improved heat dissipation through radiation and convection means.

According to one aspect of the present invention, the outer surface of the housing is enlarged with a plurality of formations for improved heat dissipation through radiation and convection means. The formations extend from the outer surface in various orientations resulting in different reflector profiles suited to the device in which the lamp housing is used.

According to one aspect of the present invention, the housing is prepared with a material to block stray visible light from escaping, thereby eliminating the need for light leakage systems. Alternatively, the housing is constructed from a material that blocks the stray visible light from escaping.

According to one aspect of the present invention, the inner surface or wall of the housing is prepared with an enhancing material to achieve high absorptivity of radiation in the infrared (IR) wavelength range. Alternatively, the housing is constructed from a material that has a naturally high absorptivity of radiation in the IR wavelength range.

In accordance with other aspects of the present invention, apparatus are provided for carrying out the above and other methods.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
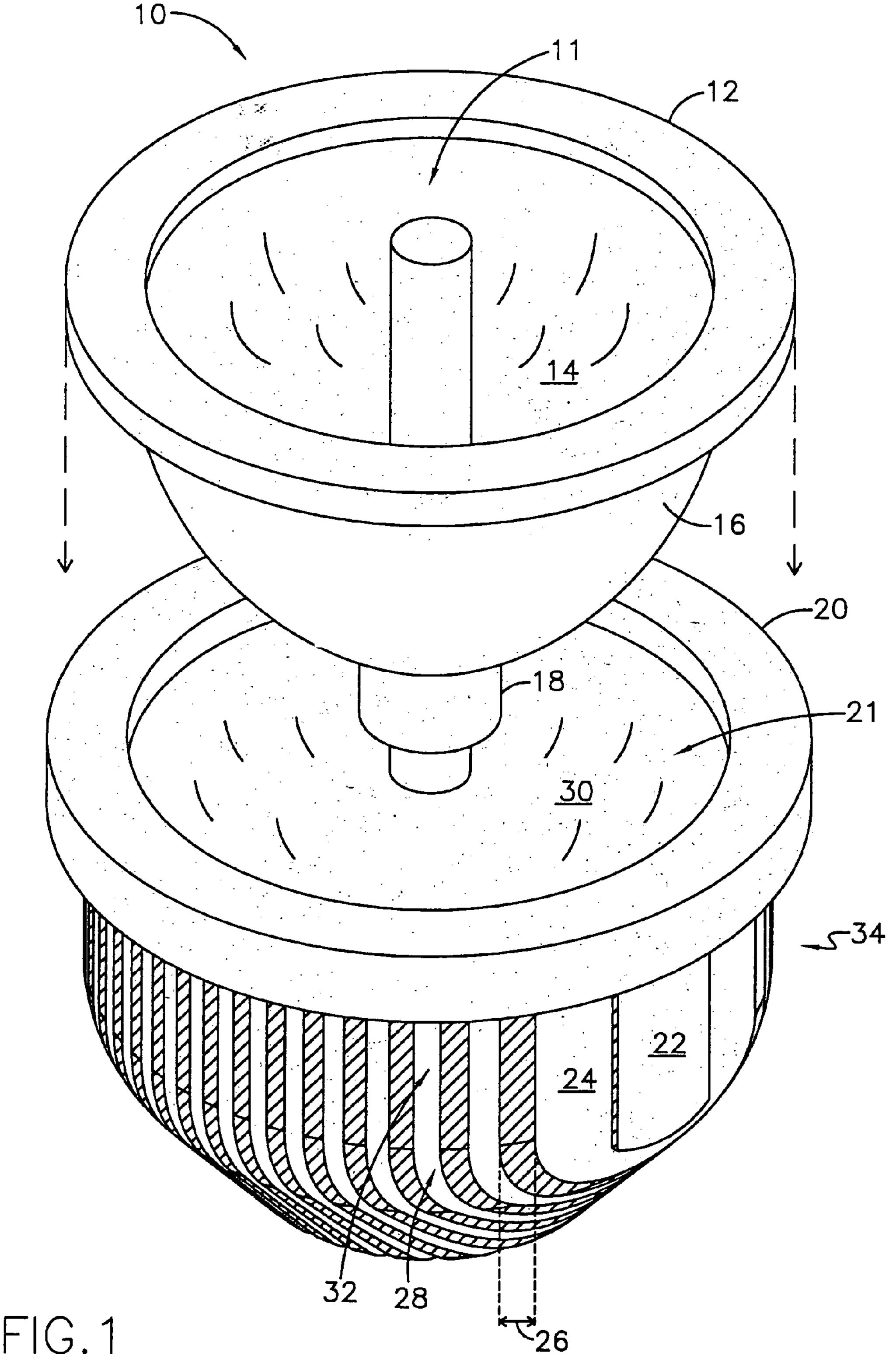
FIG. 1 illustrates an exploded perspective view of a lamp reflector and lamp reflector shell in accordance with one embodiment of the present invention.

In the following description, various aspects of the present invention, a method and apparatus for a lamp housing with improved heat dissipation and light blocking, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well-known features may be omitted or simplified in order not to obscure the present invention. Repeated usage of the phrase "in one embodiment" does not necessarily refer to the same embodiment, although it may.

A typical prior art lamp reflector is comprised of a glass or ceramic material where the inner surface functions as a cold mirror that reflects most of the visible light forward but allows the radiation to pass through. There is a fine balance between reflecting the visible light and transmitting or passing the radiation. The translucence of prior art reflectors in the visible range is an artifact of the layers of coatings on the reflector which provide the desired optical properties. But the curvature of the reflector, which determines the shape of the light going forward, can also affect the filtering properties of the coatings, which are angle sensitive and highly variable. Having all of the desired optical properties in one set of layers that make up the coatings is very difficult to achieve for a given reflector in a particular projector. Typically, the coatings are 98% efficient in the visible range, which means that 2% of the visible light may stray from the reflector in undesirable ways such as through the vents and into the room in which the projector is located. Furthermore, once the radiation is transmitted or passed through the reflector, it must be managed so that it doesn't harm the rest of the components in the projector.

The lamp housing of the present invention provides for improved heat dissipation and light blocking over standard prior art reflectors and heat sinks. In one embodiment, the lamp housing of the present invention provides a thermal environment for the lamp burner that is cooler than a standard prior art reflector. The cooler environment facilitates thermal control of the lamp burner and burner arm of the light source and therefore enhances lamp reliability and requires less direct lamp cooling. In one embodiment, the lamp housing of the present invention is not transparent to visible light as is a standard prior art reflector. Blocking the visible light eliminates the need for light leakage control systems that introduce undesirably high airflow resistance and fan noise (e.g. light-blocking air vents). Eliminating light leakage control systems and reducing the need for direct lamp cooling results in quieter projector operation.

In one embodiment, the lamp housing of the present invention may comprise a lamp reflector and a lamp reflector shell that encloses the lamp reflector. Alternatively, the lamp housing of the present invention may comprise a lamp reflector that is integral with the lamp reflector shell. In either case, the lamp housing is provided with an outer surface or wall that has enhanced heat dissipation characteristics.

In one embodiment, the enhanced heat dissipation characteristics of the outer surface is provided by means of extending the surface area of the outer surface of the lamp housing with formations such as plates, fins, pin fins, spines, and the like. The formations may be oriented in any direction so as to form a reflector profile that will complement either forced or natural convection as illustrated in the below-described exemplary embodiments. The extended surface area on the lamp housing results in lower temperatures, not only on the lamp housing itself, but on the projector case in which the lamp housing resides. Lower temperatures in the projector case provides several benefits, including: reducing or eliminating the need for special reflective shielding on the case and housing parts, which results in simplified assembly and manufacture; making it easier to comply with safety requirements for touch temperature; and enabling the use of plastics that have a lower temperature rating, which may be lighter and less expensive.

In one embodiment, the lamp housing is not transparent to visible light by means of constructing at least a portion of the lamp housing (e.g. the lamp reflector shell, or a surface of the lamp housing) from a material that is not transparent to visible light. In an alternate embodiment, the lamp housing is not transparent to visible light by means of specially preparing a surface of the housing with an opaque material that is not transparent to visible light.

In a typical application the shape of the lamp reflector and/or lamp reflector shell that comprise the lamp housing provides sufficient radiation absorbing characteristics without further enhancement. However, in one embodiment, the lamp housing may be further provided with an inner surface or wall that has enhanced radiation absorbing characteristics. If provided, the enhanced radiation absorbing characteristics of the inner surface are achieved by means of specially preparing the inner surface with a radiation absorbing material. In an alternate embodiment, the enhanced radiation absorbing characteristics are achieved by means of constructing the lamp housing from a material that is naturally high in radiation absorptivity.

FIG. 1 illustrates an exploded perspective view of a lamp reflector and lamp reflector shell in accordance with one embodiment of the present invention. The illustrated embodiment 10 comprises a lamp reflector 12 having an opening 11 on one side narrowing to a fitting 18 on the opposite side to form a contoured inner surface 14 and outer surface 16. The lamp reflector 12 may be comprised of a glass or ceramic material where the inner surface 14 functions as a cold mirror as is known in the art that reflects most of the visible light forward out of the opening 11, but allows the radiation to pass through to the outer surface 16.

As illustrated, the lamp reflector 12 operates in conjunction with a lamp reflector shell 20 in accordance with an embodiment of the present invention, the lamp reflector shell 20 also having an opening 21 on one side narrowing to a fitting 32 on the opposite side to form an inner surface 30 that is contoured similarly to outer surface 16 so that the outer surface 16 of the lamp reflector 12 fits securely inside the lamp reflector shell 20. In one embodiment, the outer surface 16 of the lamp reflector 12 fits slightly above the inner surface 30 of the lamp reflector shell 20 so that a layer of air may pass between the lamp reflector 12 and the lamp reflector shell 20. The layer of air provides an opportunity for additional heat dissipation, especially when, as is typically the case in a projector device, the layer of air is continuously exchanged with cooler air surrounding the device.

In one embodiment, the inner surface 30 of the lamp reflector shell 20 is specially prepared to enhance the absorption of radiation emitted by the light source and passed through to outer surface 16. For example, materials such as paint may be applied to the inner surface 30 to enhance absorptivity, or the inner surface 30 may be anodized. As another example, the finish of the inner surface 30 may be altered to enhance absorptivity by means of peening or knurling. In one embodiment, the lamp reflector shell 20 is constructed from a material that has a naturally high absorptivity of radiation, the inner surface 30 of which may or may not be altered to further enhance absorptivity.

The lamp reflector shell 20 also has an outer surface 34 that is enlarged with a plurality of formations 22 extending outwardly from the lamp reflector shell 20. The enlarged outer surface 34 enhances the ability of the lamp reflector shell 20 to convert radiation energy into thermal energy so that it can be removed by means of air circulation or other cooling mechanisms. In the illustrated embodiment, the formations 22 are plates 22/24 that extend in a parallel fashion along the outside of the body of the lamp reflector shell 20 from one side of the opening 21 to the other. Each plate 22/24 has a certain thickness 26 that is chosen to provide the best possible balance between heat dissipation and plate strength. The optimal thickness 26 will vary depending on the projector case into which the lamp reflector 12 and lamp reflector shell 20 is installed.

Figure 2:
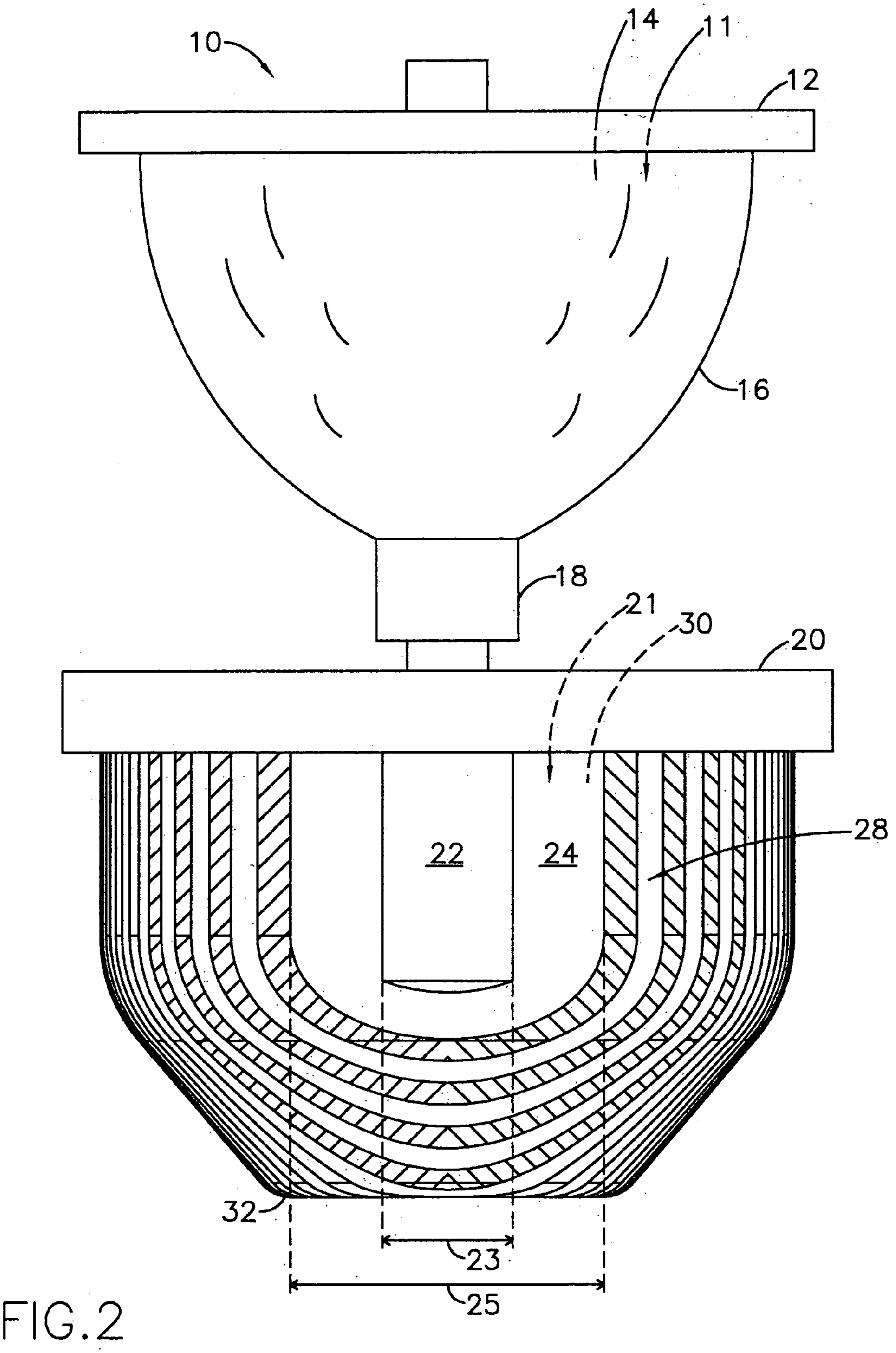
FIG. 2 illustrates a side elevational view of one side of the lamp reflector and lamp reflector shell illustrated in FIG. 1, in accordance with one embodiment of the present invention.

FIG. 2 illustrates a side elevational view of one side of the lamp reflector and lamp reflector shell illustrated in FIG. 1, in accordance with one embodiment of the present invention. As illustrated, each plate 22 varies in size corresponding to the smallest part of the opening 21 to the widest. For example, plate 22 at the outermost edge of the opening 21 has a smaller width 23 than adjacent plate 24 at the next outermost edge of the opening 21, which has a larger width 25, and so forth.

Figure 3:
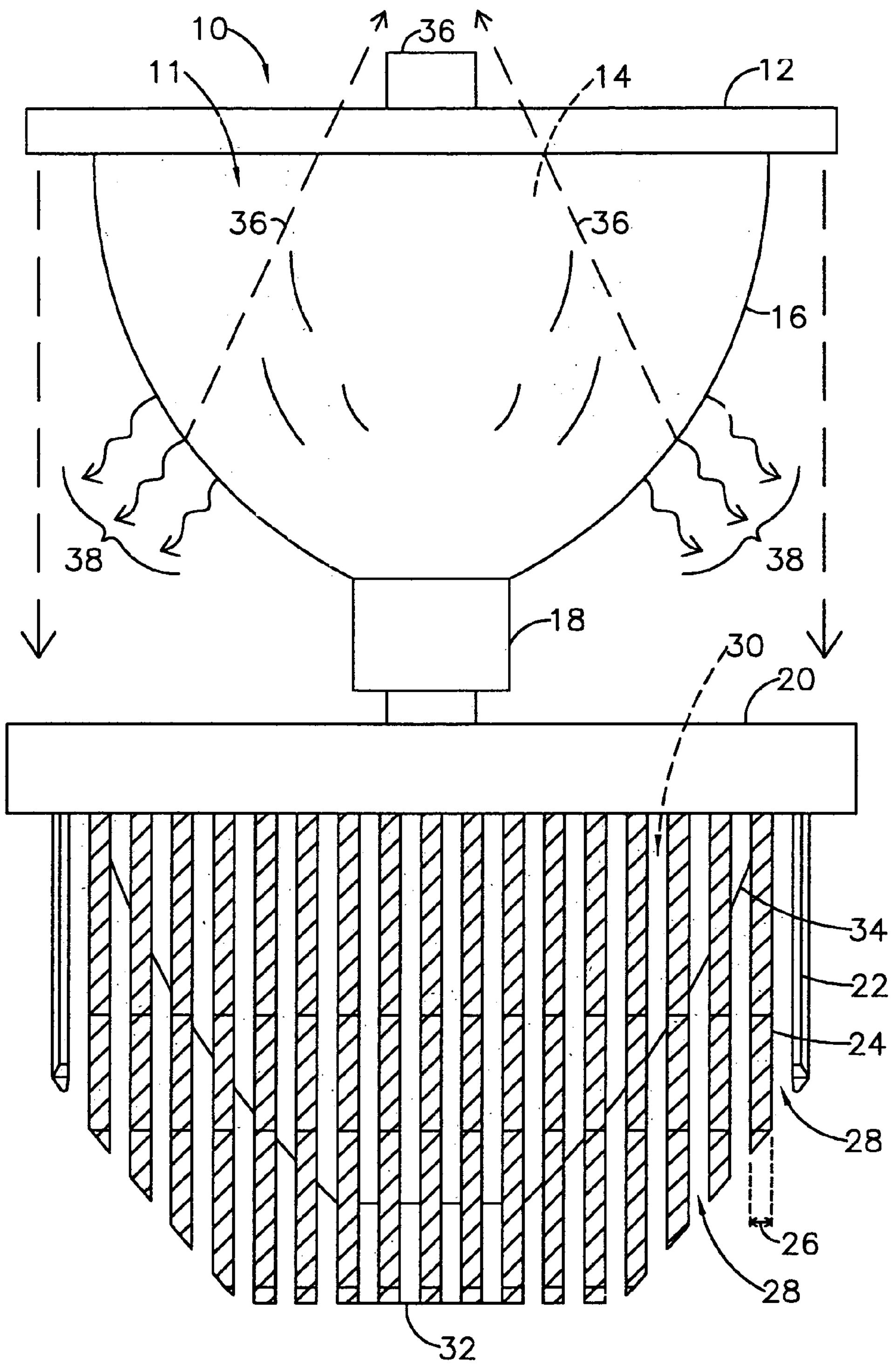
FIG. 3 illustrates a side elevational view of another side of the lamp reflector and lamp reflector shell illustrated in FIG. 1, in accordance with one embodiment of the present invention.

FIG. 3 illustrates a side elevational view of another side of the lamp reflector and lamp reflector shell illustrated in FIG. 1, in accordance with one embodiment of the present invention. During operation, a broad-spectrum high-intensity light source is positioned within the lamp reflector 12, and emits both visible light 36 and radiation 38, including IR radiation. The visible light 36 is reflected by the contoured inner surface 14 out of the opening 11. Any remaining visible light 26 is blocked by the lamp reflector shell 20. The radiation 38 is transmitted through inner surface 14 to the outer surface 16 of the lamp reflector 12, and absorbed by the inner surface 30 of the lamp reflector shell 20 by means of a special preparation applied to the inner surface 30 to enhance absorptivity of radiation, or by means of the material from which the lamp reflector shell 20 is constructed, as described with reference to FIG. 1 above. The absorbed radiation 38 radiates through the formations 22/24 along the outer surface 34 of the lamp reflector shell 20 where it can be shed as thermal energy to the air circulating in the spaces 28 between the plates 22/24 and the surrounding areas for removal by means of convection using a fan or other air circulation device. Because the formations 22/24 enlarge the area of the outer surface 34, the thermal energy is dispersed over the enlarged area and the temperature of the lamp reflector shell 20 is reduced. As a result, the operating temperature of the device in which the lamp reflector shell 20 is used is also reduced, allowing for lower fan speeds, lower device touch temperatures, and less noise.

Figure 4:
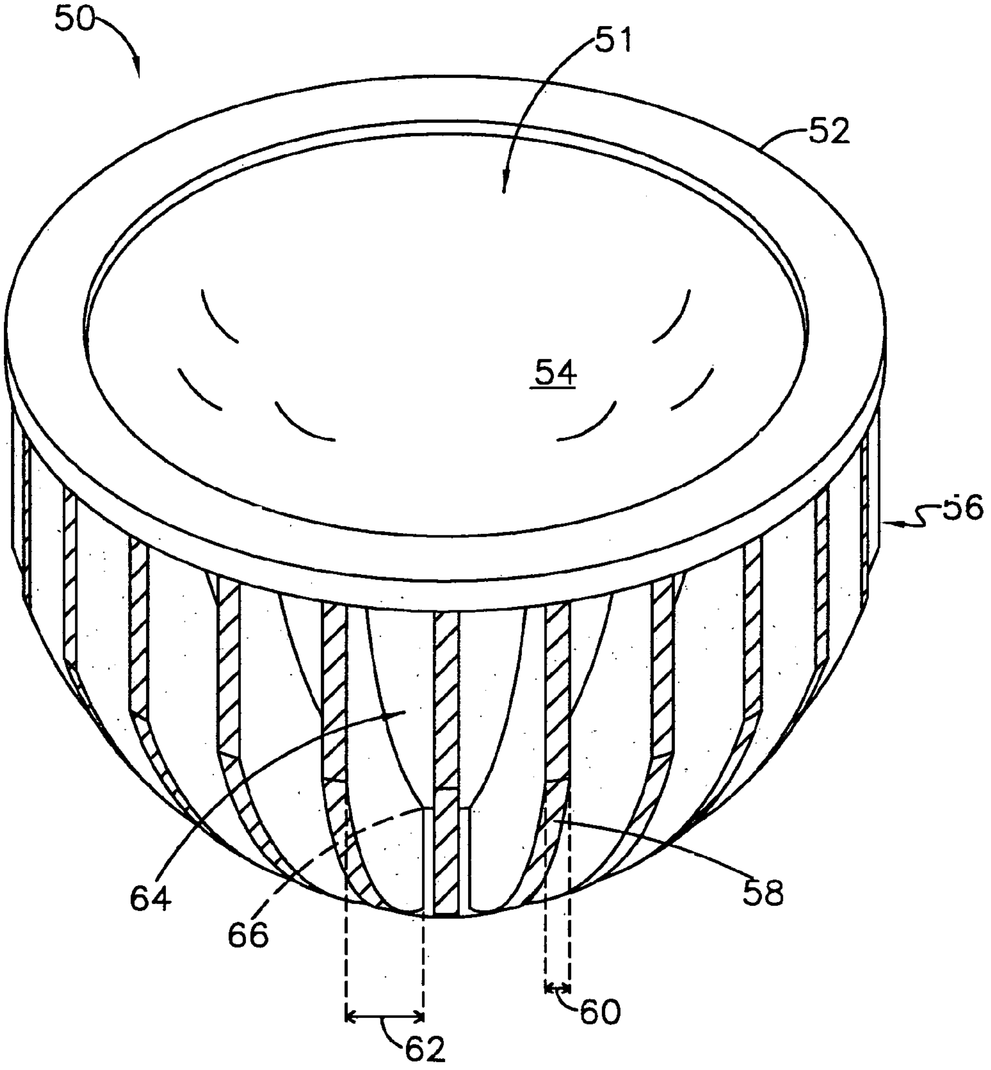
FIG. 4 illustrates a perspective view of a lamp housing in accordance with one embodiment of the present invention.

FIG. 4 illustrates a perspective view of a lamp housing in accordance with one embodiment of the present invention. The illustrated embodiment 50 comprises a lamp housing 52 having an opening 51 on one side narrowing to a closure 66 on the opposite side to form a contoured inner surface 54 and outer surface 56. The lamp reflector 52 may be comprised of a glass or ceramic material where the inner surface 54 reflects substantially all of the visible light forward out of the opening 51 and blocks any remaining stray visible light, but allows the radiation to pass through to the outer surface 56. In contrast to the embodiment 10 illustrated in FIGS. 1–3, the embodiment 50 illustrated in FIGS. 4–6 comprises a lamp housing 52 that is formed as an integral unit to perform the functions of both the lamp reflector 12 and the lamp reflector shell 20.

In the illustrated embodiment 50, the inner surface 54 of the lamp housing 52 may be specially prepared to enhance the absorption of radiation emitted by the light source. In an alternate embodiment, the lamp housing 52 is constructed from a material that has a naturally high absorptivity of radiation. The outer surface 56 is enlarged with a plurality of formations 58 extending outwardly from the body of the lamp housing 52. The enlarged outer surface 56 enhances the ability of the lamp housing 52 to convert radiation energy into thermal energy at relatively low temperatures so that it can be more easily removed by means of air circulation or other cooling mechanisms.

In the illustrated embodiment, the formations 58 are fins longitudinally disposed about the perimeter of the of the opening 51, along the outside contour of the body of the lamp housing 52, creating intervening longitudinal spaces 64. The fins 58 extend downward from the opening 51, gradually reducing in extension from the body of the lamp housing 52 until they are flush with the body and converged around closure 66. Each fin 58 is separated by distance 62 that is widest near the opening 51, gradually decreasing in size until the distance 52 converges completely at closure 66. Each fin 58 also has a certain thickness 60, where the distance 62 between the fins and thickness 60 of the fins are chosen to provide the best possible balance between enhanced heat dissipation and fin strength. The optimal thickness 60 will vary depending on the projector case into which the lamp housing 52 is installed.

Figure 5:
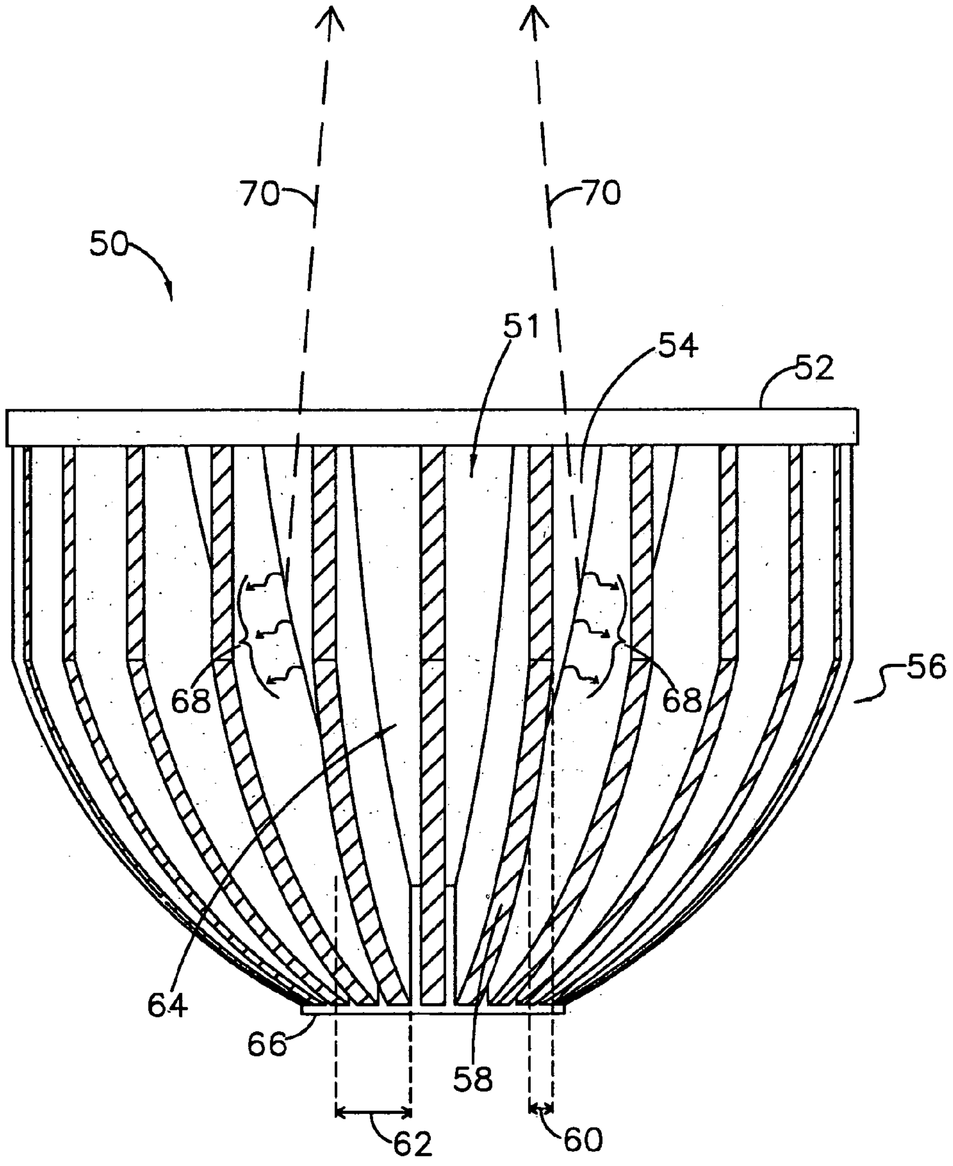
FIG. 5 illustrates a side elevational view of the lamp housing illustrated in FIG. 4, in accordance with one embodiment of the present invention.

FIG. 5 illustrates a side elevational view of one side of the lamp reflector illustrated in FIG. 4, in accordance with one embodiment of the present invention. As illustrated, each fin 58 extends downward from the top of the opening 51 of the lamp housing 52 to the bottom closure 66. During operation, a broad-spectrum high-intensity light source is positioned through the opening 51 within the lamp housing 52, and emits both visible light 70 and radiation 68, including IR radiation. The visible light 70 is reflected by the inner surface 54 out of the opening 51, but the radiation 68 is transmitted through inner surface 54 to the outer surface 56 of the lamp housing 52. The radiation 68 is absorbed by the lamp housing 52 by means of a special preparation on the inner surface 54 that enhances absorptivity of radiation, or by means of a material having high absorptivity of radiation and from which the lamp housing 52 is constructed, as described with reference to FIG. 4 above. The absorbed radiation 68 radiates through the fins 58 along the outer surface 56 of the lamp housing 52 where it can be shed as thermal energy to the air circulating in the spaces 64 between the fins 58 and the surrounding areas for removal by means of convection using a fan or other air circulation device. Because the fins 58 enlarge the area of the outer surface 56, the temperature of the lamp housing 52 is reduced. As a result, the operating temperature of the device in which the lamp housing 52 is used is also reduced, allowing for lower fan speeds, lower device touch temperatures, and less noise.

Figure 6:
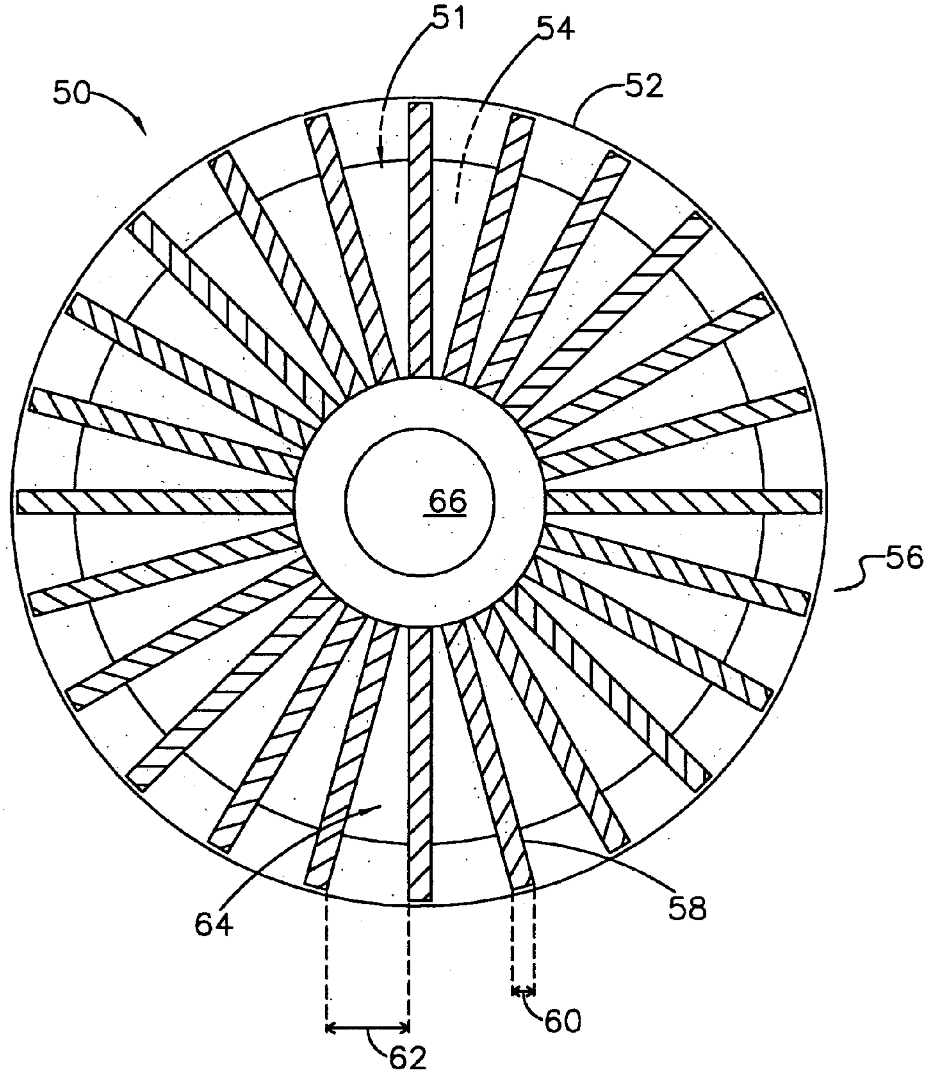
FIG. 6 illustrates a bottom plan view of the lamp housing illustrated in FIG. 4, in accordance with one embodiment of the present invention.

FIG. 6 illustrates a bottom plan view of the lamp housing illustrated in FIG. 4, in accordance with one embodiment of the present invention. As illustrated, the outer surface 56 of the lamp housing 52 is enlarged with formations of longitudinal fins 58 that extend from and encircle the lamp housing 52 disposed a distance 62 apart and converging at the bottom closure 66 to create intervening spaces 64.

Figure 7:
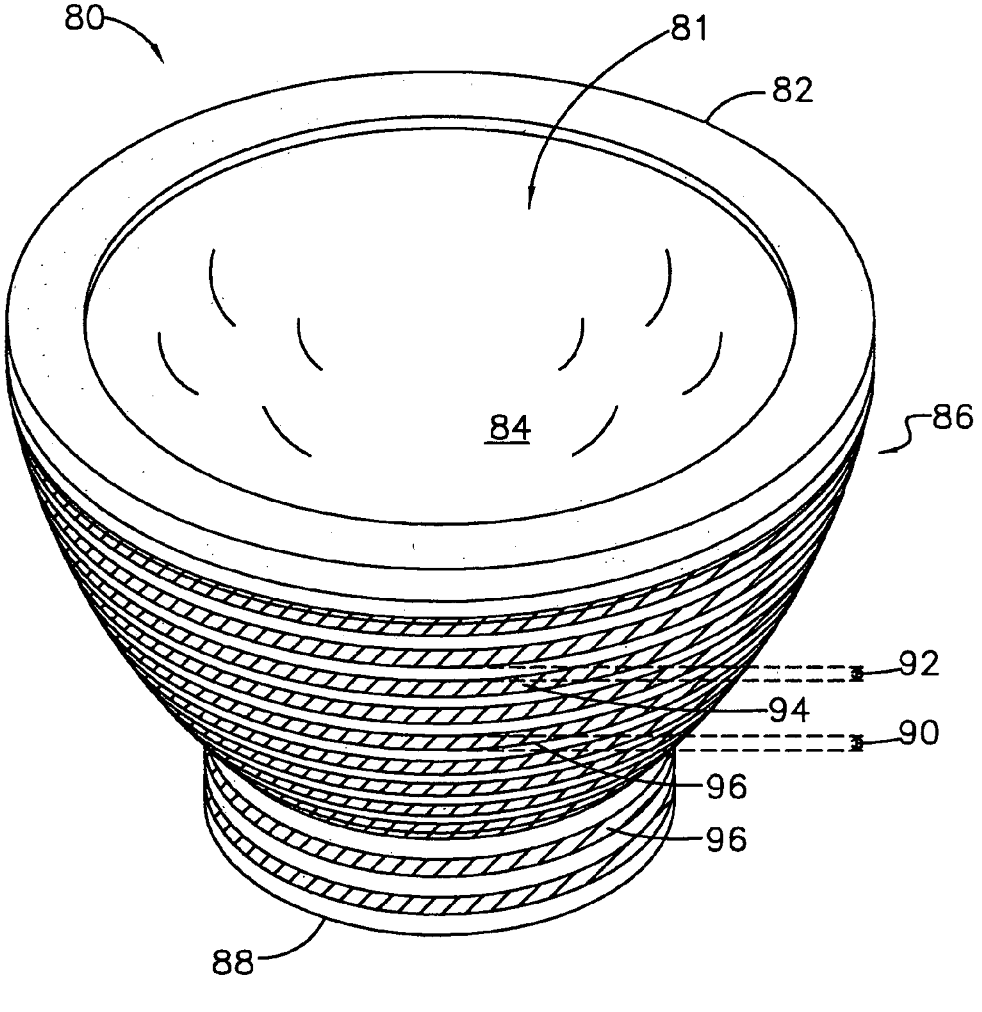
FIG. 7 illustrates a perspective view of a lamp housing in accordance with one embodiment of the present invention.

FIG. 7 illustrates a perspective view of a lamp housing in accordance with one embodiment of the present invention. The illustrated embodiment 80 comprises a lamp housing 82 having an opening 81 on one side gradually narrowing to a closure 88 on the opposite side to form a contoured inner surface 84 and outer surface 86. The lamp housing 82 may be comprised of a glass or ceramic material where the inner surface 84 reflects substantially all of the visible light forward out of the opening 81 blocking any remaining stray visible light, but allows the radiation to pass through to the outer surface 86. In contrast to the embodiment 10 illustrated in FIGS. 1–3, the embodiment 80 illustrated in FIGS. 7–9 comprises a lamp housing 82 that is formed as an integral unit to perform the functions of both the lamp reflector 12 and the lamp reflector shell 20.

In the illustrated embodiment 80, the inner surface 84 of the lamp housing 82 may be specially prepared to enhance the absorption of radiation emitted by the light source. In an alternate embodiment, the lamp housing 82 is constructed from a material that has a naturally high absorptivity of radiation. The outer surface 86 is enlarged with a plurality of formations 88 extending outwardly from the body of the lamp housing 82. The enlarged outer surface 86 enhances the ability of the lamp housing 82 to convert radiation energy into thermal energy at relatively low temperatures so that it can be more easily removed by means of air circulation or other cooling mechanisms.

In the illustrated embodiment, the formations 88 are rings 96 latitudinally disposed in layers around the outside contour of the body of the lamp housing 82, creating intervening latitudinal spaces 94. The layers of rings 96 and spaces 94 start at the opening 81, and continue to encircle the body of the lamp reflector 82 in parallel fashion until they are reach the bottom closure 88. Each ring 96 is separated by distance 92, and has a certain thickness 90, where the distance 92 and thickness 90 are chosen to provide the best possible balance between heat dissipation and ring strength. The optimal thickness 90 will vary depending on the projector case into which the lamp housing 82 is installed.

Figure 8:
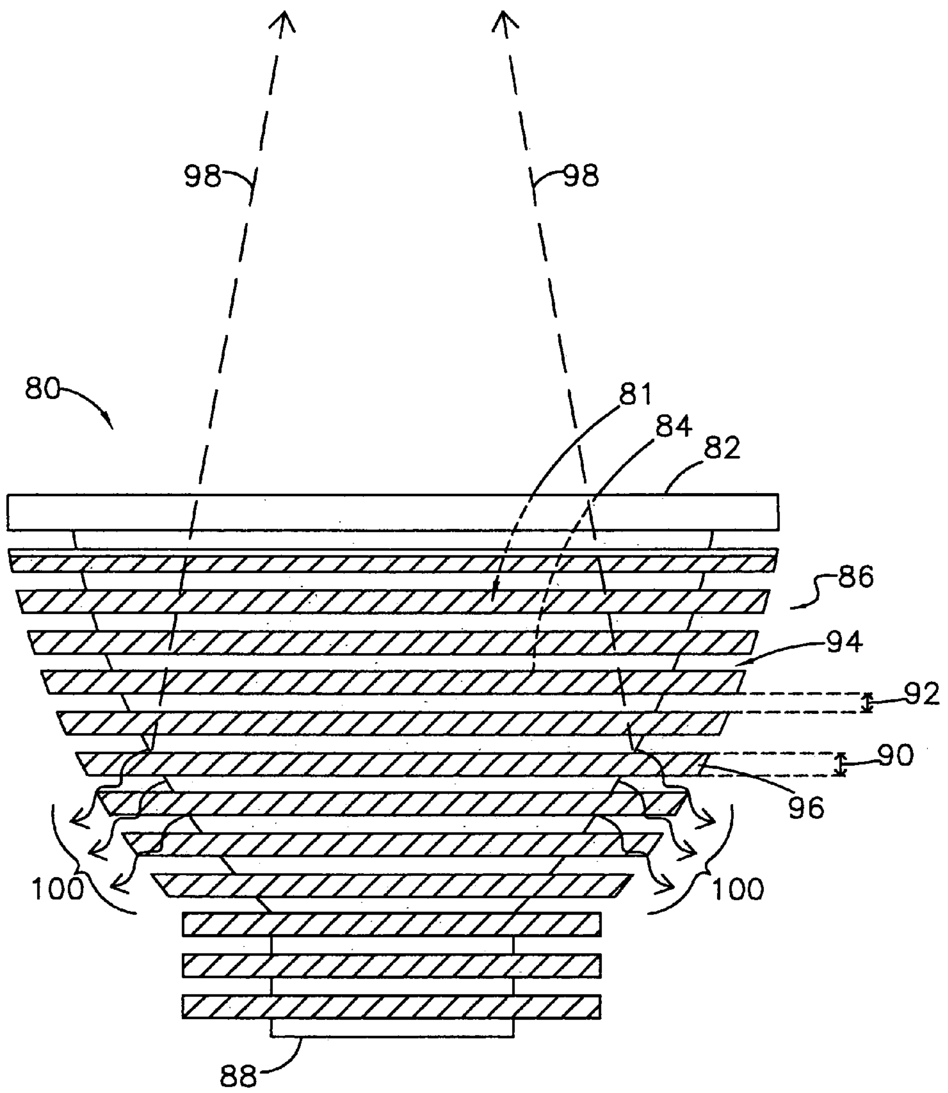
FIG. 8 illustrates a side elevational view of the lamp housing illustrated in FIG. 7, in accordance with one embodiment of the present invention.

FIG. 8 illustrates a side elevational view of one side of the lamp reflector illustrated in FIG. 7, in accordance with one embodiment of the present invention. As illustrated, each ring 96 is disposed latitudinally around the exterior of the lamp housing 82 starting from the top of the opening 81 down to the bottom closure 88. During operation, a broad-spectrum high-intensity light source is positioned through the opening 81 within the lamp housing 82, and emits both visible light 98 and radiation 100, including IR radiation. The visible light 98 is reflected by the inner surface 84 out of the opening 81, but the radiation 100 is transmitted through inner surface 84 to the outer surface 86 of the lamp housing 82. The radiation 100 is absorbed by the lamp housing 82 by means of a special preparation on the inner surface 84 to enhance absorptivity of radiation, or by means of the material from which the lamp housing 82 is constructed, as described with reference to FIG. 4 above. The absorbed radiation 100 radiates through the rings 96 along the outer surface 86 of the lamp housing 82 where it can be shed as thermal energy to the air circulating in the spaces 94 between the rings 96 and the surrounding areas for removal by means of convection using a fan or other air circulation device. Because the rings 100 enlarge the area of the outer surface 86, the temperature of the lamp housing 82 is reduced. As a result, the operating temperature of the device in which the lamp housing 82 is used is also reduced, allowing for lower fan speeds, lower device touch temperatures, and less noise.

Figure 9:
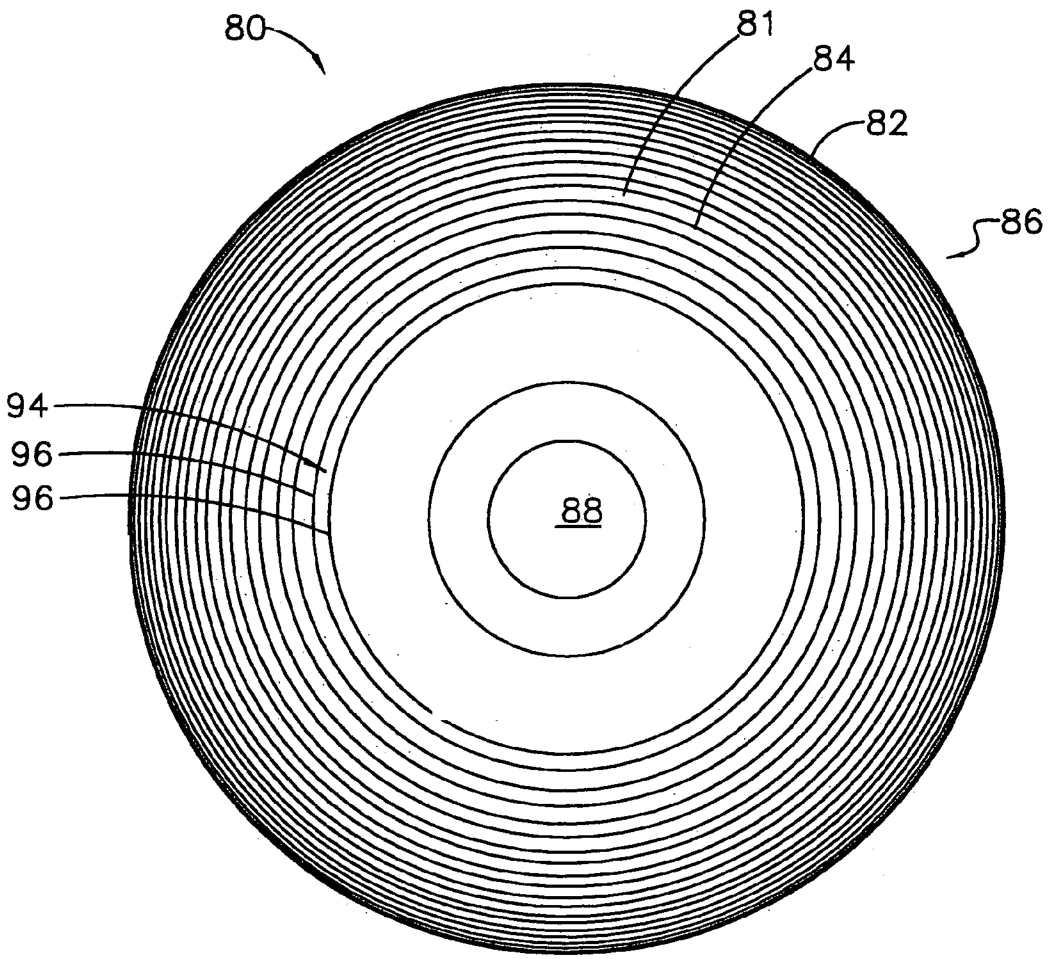
FIG. 9 illustrates a bottom plan view of the lamp housing illustrated in FIG. 7, in accordance with one embodiment of the present invention.

FIG. 9 illustrates a bottom plan view of the lamp reflector illustrated in FIG. 7, in accordance with one embodiment of the present invention. In the illustrated embodiment 80, the outer surface 86 of the lamp housing 82 is enlarged with formations of rings 96 disposed latitudinally around the lamp housing 82 to form parallel layers of rings 96 and spaces 94 from the top of the opening 81 to the bottom closure 88.

As can be seen from the foregoing description, the exemplary formations of plates 22/24, fins 58, and rings 96 illustrated in embodiments 10, 50, and 80, result in lamp housing outer surfaces 34, 56, and 86, that each have a different profile. The different profiles may be advantageously combined with airflow systems in a projection system so as to optimize the flow of air around the formations for improved removal of thermal energy from the projector case by convection.

Figure 10:
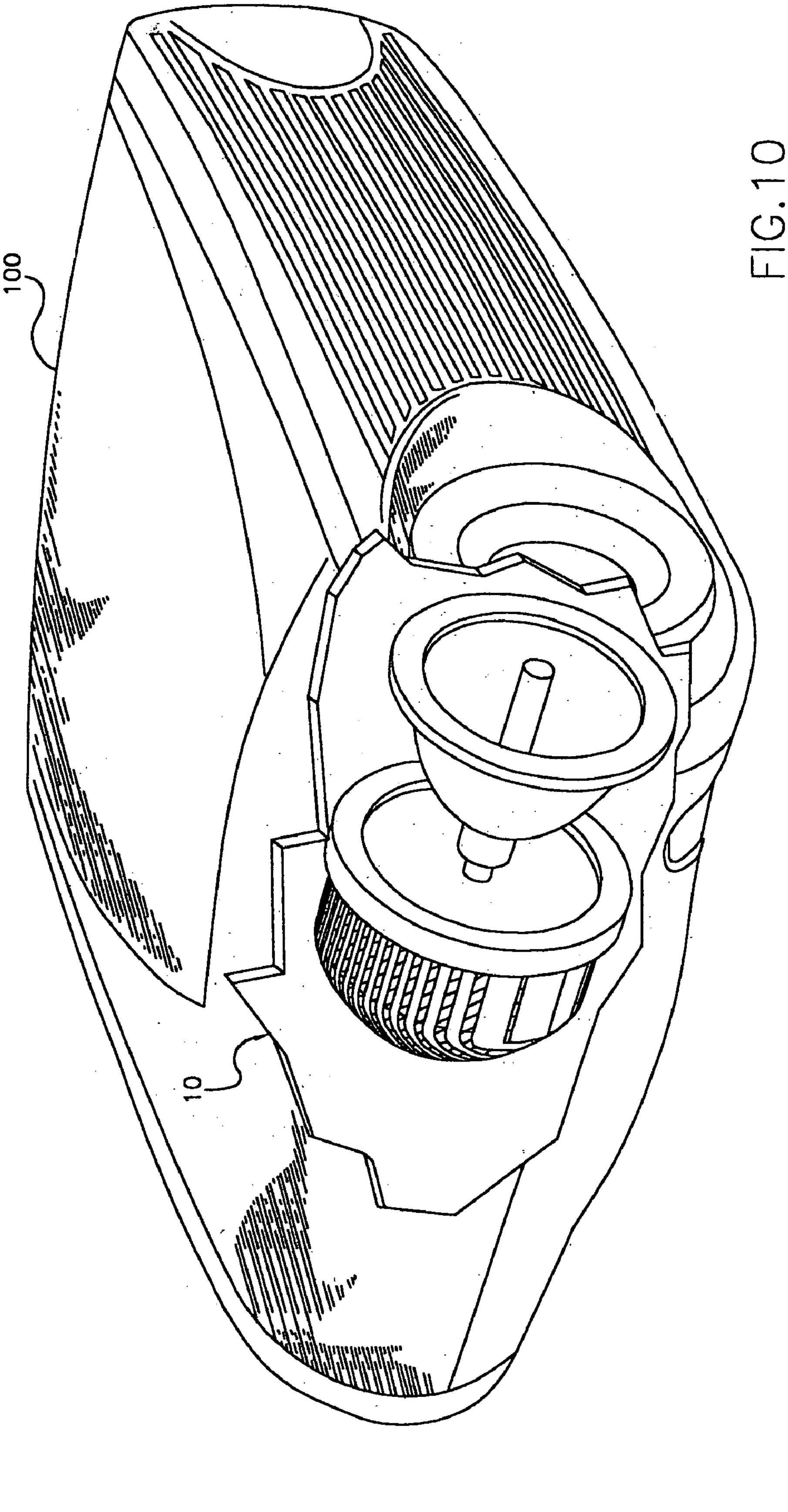
FIG. 10 illustrates a projector case into which a lamp reflector and lamp reflector shell as illustrated in FIGS. 1–3 may be incorporated in accordance with one embodiment of the present invention.

FIG. 10 illustrates a typical projector case into which a lamp reflector and lamp reflector shell as illustrated in FIGS. 1-3 may be incorporated in accordance with one embodiment of the present invention. In the illustrated embodiment, a typical projector case 100 is shown in a cutaway view to reveal the lamp reflector and lamp reflector shell 10 of FIGS. 1-3 disposed therein. As shown, the projector case 100 may be a portable type projector and has an outside surface that is accessible to the user and is referred to as a touchable surface. It should be understood that the projector case 100 as shown is for descriptive purposes only, and that other variations in the shape, size or features of the projector case 100 may be employed without departing from the principles of or exceeding the scope of the present invention. In addition, other embodiments of the invention, such as those illustrated in FIGS. 4-9, may also be disposed or encased within the projector case 100. During operation, the extended surface area on the lamp housing (i.e. the lamp reflector and lamp reflector shell of FIGS. 1-3 or the lamp housing of FIGS. 4-9) results in lower temperatures, not only on the lamp housing itself, but on the touchable surfaces of the projector case 100 in which the lamp housing resides. Lower temperatures in the projector case 100 provides several benefits, including: reducing or eliminating the need for special reflective shielding on the case and housing parts, which results in simplified assembly and manufacture; making it easier to comply with safety requirements for touch temperature; and enabling the use of plastics that have a lower temperature rating, which may be lighter and less expensive.

Accordingly, a novel method and apparatus is described for a lamp housing as illustrated in exemplary embodiments 10, 50, and 80 that, among other things, has an extended outer surface and is non-transparent to visible light. As a result, the lamp housing reflects nearly all visible light emitted from a light source in the desired shape while blocking remaining stray visible light and providing an improved thermal environment. Blocking stray visible light eliminates the need for light leakage control systems, and the improved thermal environment results in lower operating temperatures on the lamp housings and the projector case. From the foregoing description, those skilled in the art will recognize that many other variations of the present invention are possible. Thus, the present invention is not limited by the details described. Instead, the present invention can be practiced with modifications and alterations within the spirit and scope of the appended claims.

What is claimed is:

1. A lamp housing assembly comprising:

a reflector to reflect visible light and to pass radiation emitted from a light source disposed within the reflector with a reflector outer surface; and a housing coupled to the reflector, the housing including an inner surface, contoured similarly to the reflector outer surface and extending substantially about the reflector, where the inner surface is specifically altered to enhance absorptivity of passed radiation; and an outer surface having a plurality of formations so that the absorbed radiation can be transmitted as heat from the inner surface to the outer surface wherein the formations are contoured similarly to the reflector outer surface and, wherein the reflector is disposed substantially completely within the housing;

wherein the lamp housing assembly is configured to be disposed in a portable projection device.

2. The lamp housing of claim 1, wherein the housing substantially blocks visible light that strays from the reflector.

3. The lamp housing of claim 2, wherein the inner surface of the housing is prepared to block the stray visible light.

4. The lamp housing of claim 2, wherein the inner surface of the housing is prepared to enhance absorptivity of the passed radiation by anodization.

5. The lamp housing of claim 2, wherein the inner surface of the housing is prepared to enhance absorptivity of the passed radiation by applying a coating of an opaque material.

6. The lamp housing of claim 5, wherein the opaque material is paint.

7. The lamp housing of claim 2, wherein the outer surface of the housing blocks the stray visible light.

8. The lamp housing of claim 1, wherein the absorbed radiation is infrared (IR) radiation.

9. The lamp housing of claim 1, wherein the plurality of formations are plates disposed in a parallel manner across the outer surface of the housing.

10. The lamp housing of claim 1, wherein the plurality of formations are fins disposed longitudinally across the outer surface of the housing.

11. The lamp housing of claim 1, wherein the plurality of formations are rings disposed latitudinally across the outer surface of the house.

12. The lamp housing of claim 1, wherein the housing and the reflector are formed as an integral unit.

13. A projection lamp system including a projector case and a lamp housing according to claim 1, wherein the lamp housing is configured to be positioned substantially within the projector case.

14. The lamp housing of claim 1, wherein the inner surface of the housing is prepared to enhance absorptivity of the passed radiation by peening.

15. The lamp housing of claim 1, wherein the inner surface of the housing is prepared to enhance absorptivity of the passed radiation by knurling.

16. The projection lamp system of claim 1, wherein the reflector includes an opening on a first end and a fitting on the second end and the formations on the outer surface of the housing extend substantially between the opening and the fitting.

17. A lamp housing comprising:

a reflector capable of reflecting a visible light but passing a radiation emitted from a light source disposed within the reflector; and a housing coupled to the reflector, the housing having an inner surface capable of absorbing the passed radiation and an outer surface having a plurality of formations to enlarge the area of the outer surface so that the absorbed radiation can be transmitted as heat from the inner surface to the outer surface at a reduced temperature, wherein the inner surface of the housing is prepared to enhance absorptivity of the passed radiation by peening, wherein the housing is further capable of blocking the visible light that strays from the reflector.

18. A lamp housing comprising:

a reflector capable of reflecting a visible light but passing a radiation emitted from a light source disposed within the reflector; and a housing coupled to the reflector, the housing having an inner surface capable of absorbing the passed radiation and an outer surface having a plurality of formations to enlarge the area of the outer surface so that the absorbed radiation can be transmitted as heat from the inner surface to the outer surface at a reduced temperature, wherein the inner surface of the housing is prepared to enhance absorptivity of the passed radiation by knurling, wherein the housing is further capable of blocking the visible light that strays from the reflector.

19. An apparatus comprising:

a means for a reflector that is capable of reflecting a visible light but passing a radiation emitted from a means for a light source disposed within the reflector; and a means for a housing coupled to the reflector means, the housing means having an inner surface and an outer surface, wherein the housing means include a means for absorbing the passed radiation through the inner surface and a means for enlarging the area of the outer surface with a plurality of formations so that the absorbed radiation can be transmitted as heat from the inner surface to the outer surface at a reduced temperature, wherein the means for absorbing the passed radiation through the inner surface is enhanced by peening the inner surface.

20. An apparatus comprising:

a means for a reflector that is capable of reflecting a visible light but passing a radiation emitted from a means for a light source disposed within the reflector; and a means for a housing coupled to the reflector means, the housing means having an inner surface and an outer surface, wherein the housing means include a means for absorbing the passed radiation through the inner surface and a means for enlarging the area of the outer surface with a plurality of formations so that the absorbed radiation can be transmitted as heat from the inner surface to the outer surface at a reduced temperature, wherein the means for absorbing the passed radiation through the inner surface is enhanced by knurling the inner surface.

21. A method for managing light and radiation in a lamp comprising:

disposing a lamp that emits a visible light and a radiation in a reflector, the reflector reflecting the visible light but passing the radiation, wherein the reflector has an opening on a first end and a fitting on a second end; and encasing the lamp and reflector substantially completely within a housing, the housing having an inner surface configured to substantially correspond to the reflector and extend substantially around the reflector where the inner surface is specifically altered to enhance absorptivity of the passed radiation, and an outer surface from which extend a plurality of formations to enlarge the area of the outer surface so that the absorbed radiation can be emitted as heat from the outer surface at a reduced temperature wherein the formations extend substantially from the reflector opening on the first end to the fitting on the second end.

22. The method of claim 21, further comprising blocking the visible light that strays from the reflector with the housing.

23. The method of claim 22, wherein the blocking is performed by the inner surface of the housing.

24. The method of claim 22, wherein the blocking is performed by the outer surface of the housing.

25. The method of claim 22, wherein the absorbed radiation is infrared (IR) radiation.

26. The method of claim 22, wherein the plurality of formations are plates disposed in a parallel manner across the outer surface of the housing.

27. The method of claim 22, wherein the plurality of formations are fins disposed longitudinally across the outer surface of the housing.

28. The method of claim 22, wherein the plurality of formations are rings disposed latitudinally across the outer surface of the housing.

29. The method of claim 22, further comprising forming the housing and the reflector an in integral unit.

30. A projection lamp system utilizing the method for managing light and radiation in a lamp according to claim 21.

31. A projection lamp system, comprising:

a projector case;

a lamp housing disposed within the projector case, the lamp housing further including:

a reflector to reflect visible light and to selectively pass radiation emitted from a light source disposed within the reflector, the reflector having a first end and a second end; and a reflector shell coupled to the reflector having an inner surface specifically altered to enhance the absorption of the passed radiation from the reflector, wherein the reflector shell is contoured similarly to the reflector and an outer surface with a plurality of formations to enlarge the area of the outer surface so that the absorbed radiation can be transmitted as heat from the inner surface to the outer surface and where the formations extend generally between the first end and the second end of the reflector;

wherein the reflector is disposed substantially within the reflector shell.

32. The projection lamp system of claim 31, wherein the housing blocks the visible light that strays from the reflector.

33. The projection lamp system of claim 32, wherein the inner surface is prepared to block the stray visible light.

34. The projection lamp system of claim 32, wherein the inner surface is prepared to enhance absorptivity of the passed radiation.

35. The projection lamp system of claim 34, wherein the inner surface is prepared to enhance absorptivity of the passed radiation by applying a coating of an opaque material.

36. The projection lamp system of claim 35, wherein the opaque material is paint.

37. The projection lamp system of claim 34, wherein the inner surface is prepared to enhance absorptivity of the passed radiation by anodization.

38. The projection lamp system of claim 32, wherein the outer surface blocks the stray visible light.

39. The projection lamp system of claim 31, wherein the absorbed radiation is infrared (IR) radiation.

40. The projection lamp system of claim 31, wherein the plurality of formations are plates disposed in a parallel manner across the outer surface.

41. The projection lamp system of claim 31, wherein the plurality of formations are fins disposed longitudinally across the outer surface.

42. The projection lamp system of claim 31, wherein the plurality of formations are rings disposed latitudinally across the outer surface.

43. The projection lamp system of claim 31, wherein the housing and the reflector are formed as an integral unit.

44. The projection lamp system of claim 31, wherein the inner surface is prepared to enhance absorptivity of the passed radiation by peening.

45. The projection lamp system of claim 31, wherein the inner surface is prepared to enhance absorptivity of the passed radiation by knurling.

46. A projection lamp system, comprising:

a projector case having a touchable surface;

a lamp housing disposed within the projector case, the lamp housing further including:

a reflector to reflect a visible light and passing radiation emitted from a light source disposed within the reflector; and a reflector shell coupled to the reflector, the reflector shell having an inner surface to absorb passed radiation and an outer surface with a plurality of formations to enlarge the area of the outer surface so that the absorbed radiation can be transmitted as heat from the inner surface to the outer surface at a reduced temperature, and so that the touchable surface of the projector case is within safety requirements for touch temperature;

wherein the inner surface is prepared to enhance absorptivity of the passed radiation by peening; and wherein the housing blocks the visible light that strays from the reflector.

47. A projection lamp system, comprising:

a projector case having a touchable surface;

a lamp housing disposed within the projector case, the lamp housing further including:

a reflector to reflect a visible light and passing radiation emitted from a light source disposed within the reflector; and a reflector shell coupled to the reflector, the reflector shell having an inner surface to absorb passed radiation and an outer surface with a plurality of formations to enlarge the area of the outer surface so that the absorbed radiation can be transmitted as heat from the inner surface to the outer surface at a reduced temperature, and so that the touchable surface of the projector case is within the safety requirements for touch temperature;

wherein the inner surface is prepared to enhance absorptivity of the passed radiation by knurling; and wherein the housing blocks the visible light that strays from the reflector.

48. A lamp housing comprising:

a reflector to reflect visible light and to pass radiation emitted from a light source disposed within the reflector; and a housing coupled to the reflector, the housing having an inner surface, contoured similarly to the reflector, to absorb passed radiation and an outer surface having a plurality of formations so that the absorbed radiation can be transmitted as heat from the inner surface to the outer surface;

wherein the reflector is disposed substantially completely within the housing; and wherein the inner surface of the housing is prepared to enhance absorptivity of the passed radiation by knurling.

49. A lamp housing comprising:

a reflector to reflect visible light and to pass radiation emitted from a light source disposed within the reflector; and a housing coupled to the reflector, the housing having an inner surface, contoured similarly to the reflector, to absorb passed radiation and an outer surface having a plurality of formations so that the absorbed radiation can be transmitted as heat from the inner surface to the outer surface;

wherein the reflector is disposed substantially completely within the housing; and wherein the inner surface of the housing is prepared to enhance absorptivity of the passed radiation by knurling.

50. A projection lamp system, comprising:

a projector case;

a lamp housing disposed within the projector case, the lamp housing further including:

a reflector to reflect visible light and to pass a radiation emitted from a light source disposed within the reflector; and a reflector shell coupled to the reflector having an inner surface to absorb the passed radiation from the reflector and an outer surface with a plurality of formations to enlarge the area of the outer surface so that the absorbed radiation can be transmitted as heat from the inner surface to the outer surface;

wherein the reflector is disposed substantially completely within the housing; and wherein the inner surface is prepared to enhance absorptivity of the passed radiation by peening.

51. A projection lamp system, comprising:

a projector case;

a lamp housing disposed within the projector case, the lamp housing further including:

a reflector to reflect visible light and to pass a radiation emitted from a light source disposed within the reflector; and a reflector shell coupled to the reflector having an inner surface to absorb the passed radiation from the reflector and an outer surface with a plurality of formations to enlarge the area of the outer surface so that the absorbed radiation can be transmitted as heat from the inner surface to the outer surface;

wherein the reflector is disposed substantially completely within the housing; and wherein the inner surface is prepared to enhance absorptivity of the passed radiation by knurling.

* * * * *